United States Patent [19]

Okumura et al.

[11] Patent Number: 4,734,610

[45] Date of Patent: Mar. 29, 1988

[54] VIBRATION WAVE MOTOR

[75] Inventors: Ichiro Okumura; Hitoshi Mukohjima, both of Yokohama; Sadayuki Ueha, Machida, all of Japan

[73] Assignee: Canon Kabushiki Kaisha, Tokyo, Japan

[21] Appl. No.: 29,182

[22] Filed: Mar. 23, 1987

[30] Foreign Application Priority Data

| Mar. 25, 1986 | [JP] | Japan | 61-67588 |
| Sep. 30, 1986 | [JP] | Japan | 61-232665 |
| Sep. 30, 1986 | [JP] | Japan | 61-232666 |
| Sep. 30, 1986 | [JP] | Japan | 61-232667 |

[51] Int. Cl.$^4$ .......................................... H01L 41/08
[52] U.S. Cl. ............................. 310/323; 310/328; 310/321; 310/317
[58] Field of Search .............. 310/317, 321, 323, 328, 310/333

[56] References Cited

U.S. PATENT DOCUMENTS

| 3,238,476 | 3/1966 | Borner et al. | 310/333 X |
| 3,351,393 | 11/1967 | Emmrich | 310/328 X |
| 3,595,007 | 7/1971 | Baker, Jr. | 310/321 X |
| 4,210,837 | 7/1980 | Vasilieu et al. | 310/323 |
| 4,600,854 | 7/1986 | Bednorz et al. | 310/328 X |
| 4,634,916 | 1/1987 | Okada et al. | 310/328 X |
| 4,663,556 | 5/1987 | Kumada | 310/323 X |

Primary Examiner—Mark O. Budd
Attorney, Agent, or Firm—Fitzpatrick, Cella, Harper & Scinto

[57] ABSTRACT

A vibration wave motor includes circular shape vibration part having a helical stepped portion inside or outside thereof; a unit, coupled to said vibration part for causing the vibration part to generate a travelling vibration wave propagating along a circumferential direction of the vibration part; and a movable part having a stepped portion threadably engaged with the helical stepped portion, the movable part being frictionally driven by the travelling vibration wave generated by the vibration part.

13 Claims, 26 Drawing Figures

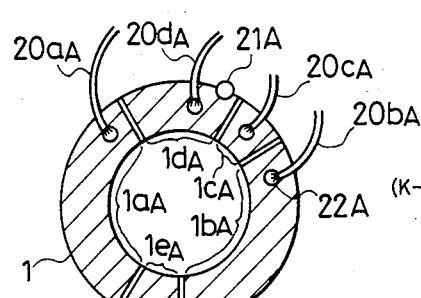
FIG. 11A
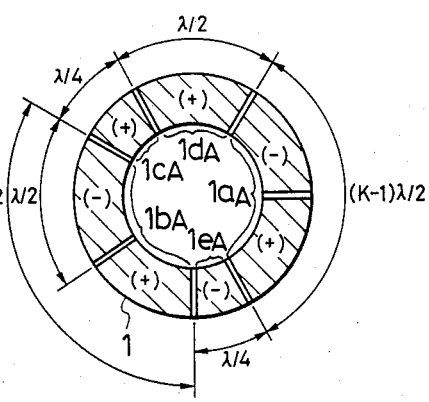
FIG. 11B
FIG. 12A
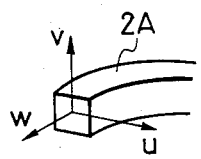
FIG. 12B
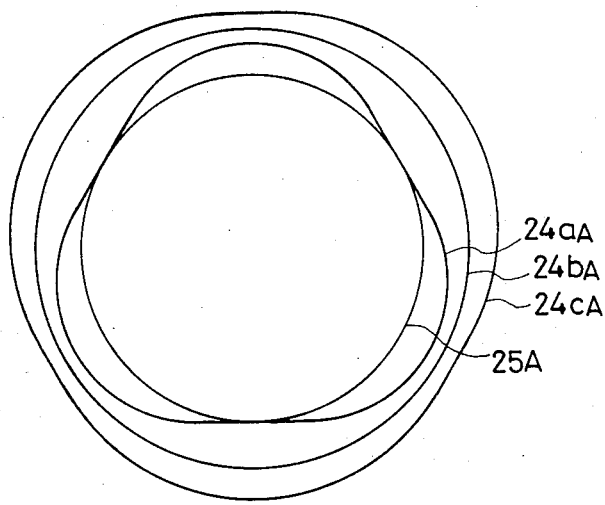
FIG. 13A
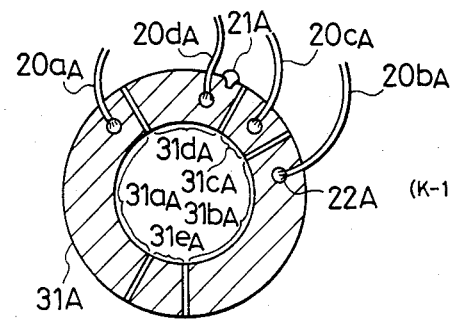
FIG. 13B
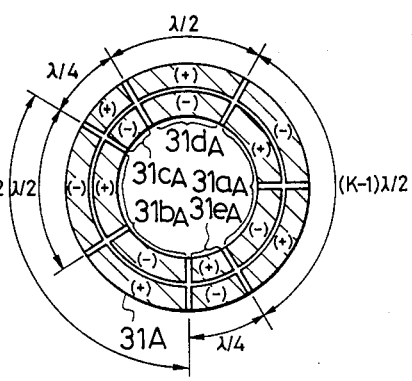

4,734,610

VIBRATION WAVE MOTOR

BACKGROUND OF THE INVENTION

1. Field of the Invention

The present invention relates to a vibration wave motor for driving a movable member by a vibration wave and, more particularly, to a so-called circumferential opposing type vibration wave motor having a structure for converting rotary movement into linear movement.

2. Related Background Art

Various structures of a conventional vibration wave motor for rotating a movable member by utilizing a vibration wave generated by an elastic ring have been proposed, as disclosed in Japanese Patent Unexamined Publication No. 201684/1984.

In order to convert rotary movement into linear movement in a conventional vibration wave motor of this type, a mechanism for converting rotary movement into linear movement, such as a screw, a rack, a gear, and the like is required. In order to move a camera lens in the axial direction thereof, a conversion mechanism using a separate helicoid for converting rotary movement of a movable member into linear movement is required, as disclosed in Japanese Patent Unexamined Publication No. 111117/1984. However, in a conventional apparatus wherein the separate conversion mechanism is used to convert rotary movement generated by the movable member into linear movement, a large energy loss is caused and a motor output must be increased by the loss.

SUMMARY OF THE INVENTION

It is an object of the present invention to provide a vibration wave motor wherein a conventional separate conversion mechanism for converting the direction of movement is omitted, and energy loss is small.

In order to achieve the above object of the present invention, a helical threaded portion is formed on a circular shape vibration member, and a contact member (i.e., a movable member) screwed with the threaded portion is moved in a direction different from a vibration wave propagation direction. More particularly, the vibration member and the contact member are relatively moved in the axial direction of the circular shape vibration member.

It is another object of the present invention to provide a simple, compact vibration wave motor of a circumferential opposing type.

In order to achieve the above object of the present invention, there is provided a vibration wave motor for frictionally driving a movable member brought into contact with an inner or outer surface of a vibration member under pressure by a travelling vibration wave generated by the circular shape vibration member and propagating in the circumferential direction, wherein the vibration member is threadably engaged with a movable member, a thin ring-like piezoelectric element is adhered to the end face of the vibration member, and an alternating voltage having a phase difference is applied to the piezoelectric element.

It is still another object of the present invention to provide a circumferential opposing type vibration wave motor wherein the vibration member can be accurately positioned at a high load of a movable member without adversely affecting the characteristics of the vibration member.

In order to achieve the above object of the present invention, there is provided a vibration wave motor comprising a circular shape vibration member having a threaded portion on the linear or outer surface, means for generating a travelling vibration wave propagating in a circumferential direction of the vibration member, a movable member threadably engaged with the vibration member and driven by the travelling vibration wave generated by the vibration member, projections formed on an end face of the vibration member at equal angluar pitches along the circumferential direction, and a positioning member engaged with the projections to position the circular shape vibration member.

BRIEF DESCRIPTION OF THE DRAWINGS

FIGS. 11A and 11B are plan views of a piezoelectric element for extensional vibration in the motor unit shown in FIG. 10;

FIGS. 12A and 12B are views for explaining the operation in the extensional vibration mode;

FIGS. 13A and 13B are plan views of a piezoelectric element for flexural vibration in the plane of a ring in the motor unit shown in FIG. 10;

DESCRIPTION OF THE PREFERRED EMBODIMENTS

Figure 1:
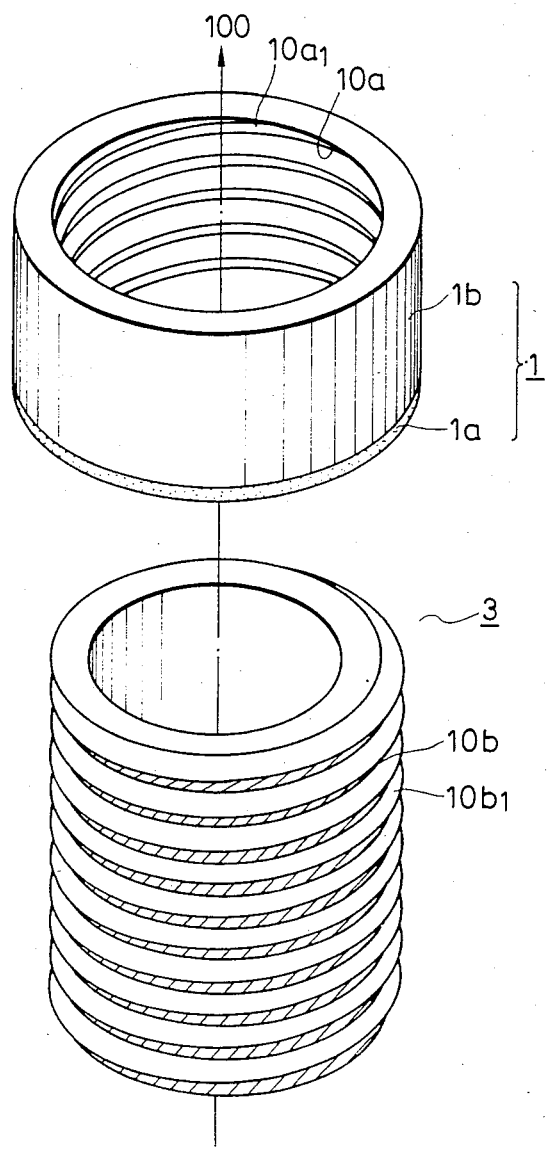
FIG. 1 is a perspective view of a vibration member and a movable member in a vibration wave motor according to an embodimennt of the present invention.

Referring to FIG. 1, an electro-mechanical energy conversion element 1a comprises a piezoelectric ceramic material. A vibration member 1b comprises a vibration ring made of a metal (e.g., an aluminum alloy, an iron-nickel alloy, stainless steel, brass, or phosphor bronze) or a circular shape ceramic material such as alumina. A threaded portion 10a consisting of recesses 10a1 is formed on the inner surface of the vibration ring 1b. The piezoelectric ceramic member 1a constitutes a vibration member 1 adhered to the vibration ring 1b by an adhesive. Voltage signals having a phase difference (e.g., 90°) are applied to the piezoelectric ceramic member 1a arranged to provide a phase difference, and a travelling vibration wave is generated by a known principle in the vibration member. A movable member 3 is brought into contact with the vibration member 1. A threaded portion 10b consisting of projections 10b1 is formed on the outer surface of the movable member 3. The vibration member 1 threadably engaged with the threaded portion 10a of the vibration member 3 is fixed by a fixing means (not shown). When the movable member 3 is rotated relative to the vibration member 1 by a vibration wave excited by the piezoelectric ceramic, helical movement is caused and the movable member 3 is moved in a direction of a central axis 100 of the vibration ring 1b.

The vibration mode of the vibration member 1 may be a mode of extensional vibration of a ring described in Lecture Papers (October 1984) of the Institute of Japanese Acoustics or Japanese Patent Application No. 49057/1985, or a mode of flexural vibration in the plane of a ring to cause a radial displacement of the vibration member, as disclosed in Japanese Patent Unexamined Publication No. 210175/1985.

Figure 2:
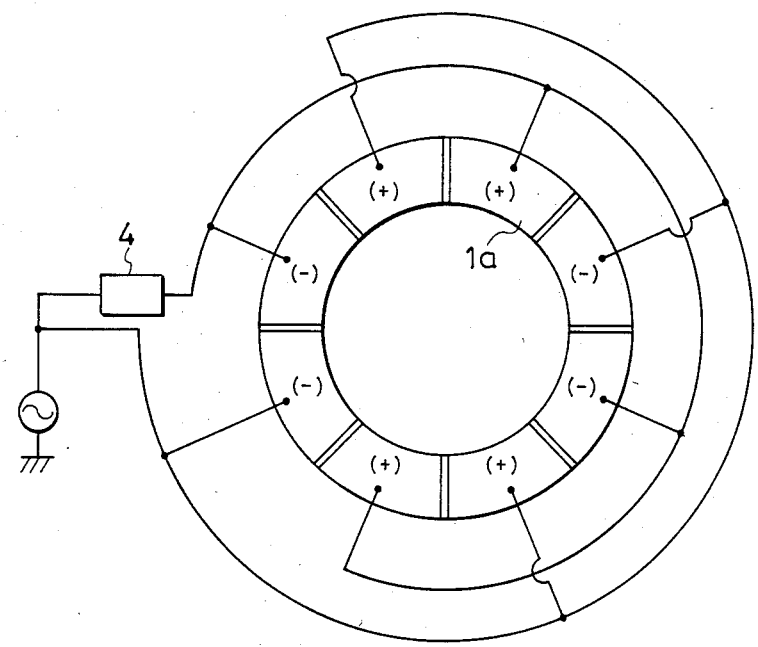
FIG. 2 is a view showing an electrode pattern, polarities, and electrical connections of a piezoelectric ceramic element for extensional or compressional vibration.

FIG. 2 shows an electrode pattern and polarities of the piezoelectric ceramic member 1a vibrated in the extensional mode of a circular ring, and electrical connections for receiving the voltage signals having a 90° phase difference. Eight split electrodes are formed on the surface of the piezoelectric ceramic member 1a. The symbols (+) and (−) represent polarities polarized in a direction perpendicular to the surface of the drawing of FIG. 2, respectively. Every other one of the electrodes are commonly connected. Voltage signals having a phase difference of 90° are applied to the groups of electrodes, respectively. The arrangement in FIG. 2 includes a 90° phase shifter 4. FIG. 2 shows a method for setting a secondary mode of extensional vibration of a ring. By changing the number of divided electrodes, modes of other orders can be set. If a primary or higher-order mode is set, the movable member can be driven in principle.

Figure 3:
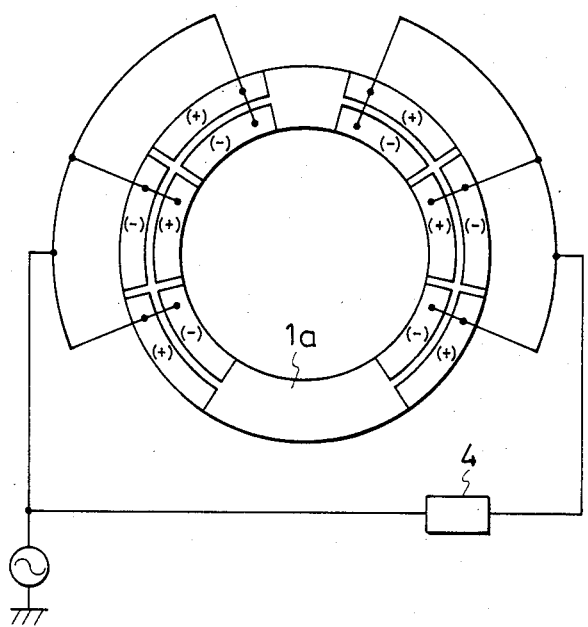
FIG. 3 is a view showing an electrode pattern, polarities, and electrical connections of a piezoelectric ceramic element for flexural vibration in the plane of the ring-like piezoelectric element.
Figure 4:
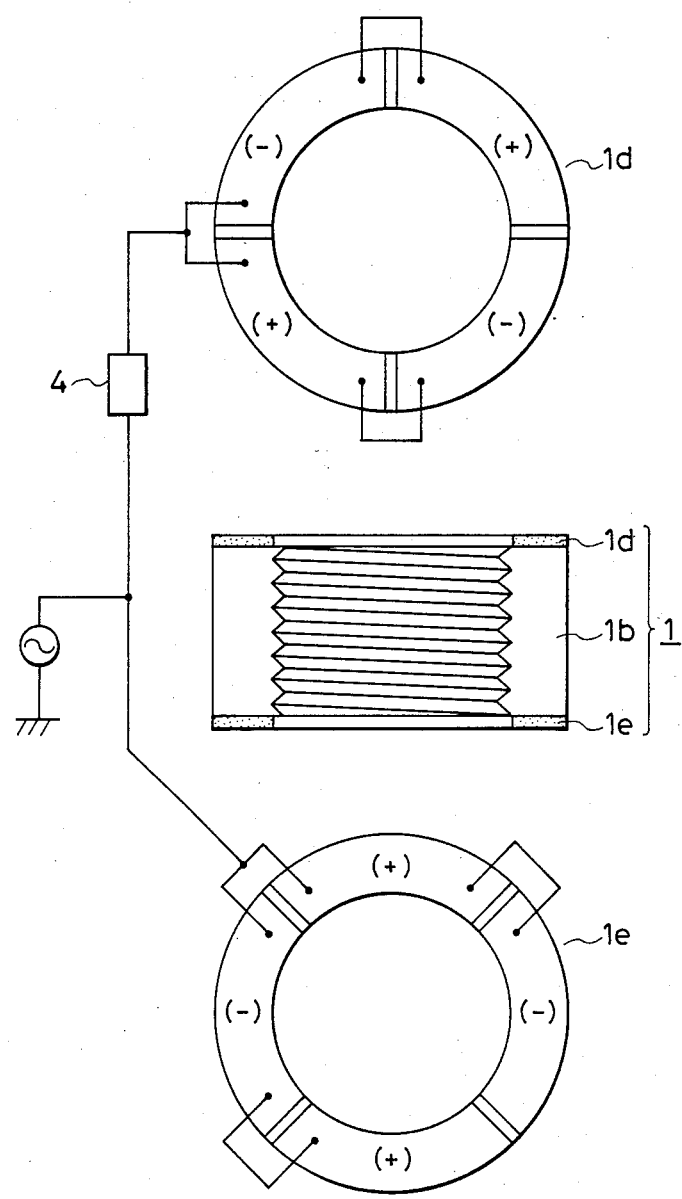
FIGS. 4 and 5 are views showing structures of vibration members wherein piezoelectric ceramic members are respectively bonded to end faces of the vibration member.

FIG. 3 shows an electrode pattern and polarities of the piezoelectric ceramic member 1a for flexural vibration in the plane of a circular ring, and electrical connections for receiving voltage signals having a 90° phase difference. The arrangment in FIG. 3 includes the piezoelectric ceramic element 1a and a conventional 90° phase shifter 4. FIG. 3 shows a method for setting a quaternary mode for flexural vibration in the plane of the ring. However, if a primary or higher-order mode is used, the movable member can be driven.

Figure 6:
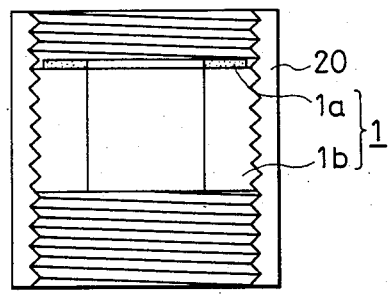
FIG. 6 is a sectional view showing a vibration member with a male threaded portion.

In the above embodiment, the circular shape piezoelectric ceramic member 1a is disposed on only the lower surface of the vibration ring 1b in FIG. 1, and the circular shape piezoelectric ceramic member 1a is driven to cause the vibration ring 1b to generate the vibration wave. With this arrangement, the travelling vibration wave tends to generate only near the contact portion between the vibration ring 1b and the piezoelectric ceramic member 1a. It is therefore difficult to uniformly transmit the vibration ring through the vibration ring 1b. In the arrangement of FIG. 6, the piezoelectric ceramic elements 1d and 1e having a phase difference of ¼ of the wavelength are respectively bonded to end faces of the vibration ring 1b. Voltage signals having a phase difference of 90° are applied to the piezoelectric ceramic elements 1d and 1e, thereby generating the travelling vibration wave for extensional vibration throughout the vibration ring 1b. In this case, as compared with the arrangment in FIGS. 1 and 2, a higher output can be generated and the motor can be effectively driven.

Figure 5:
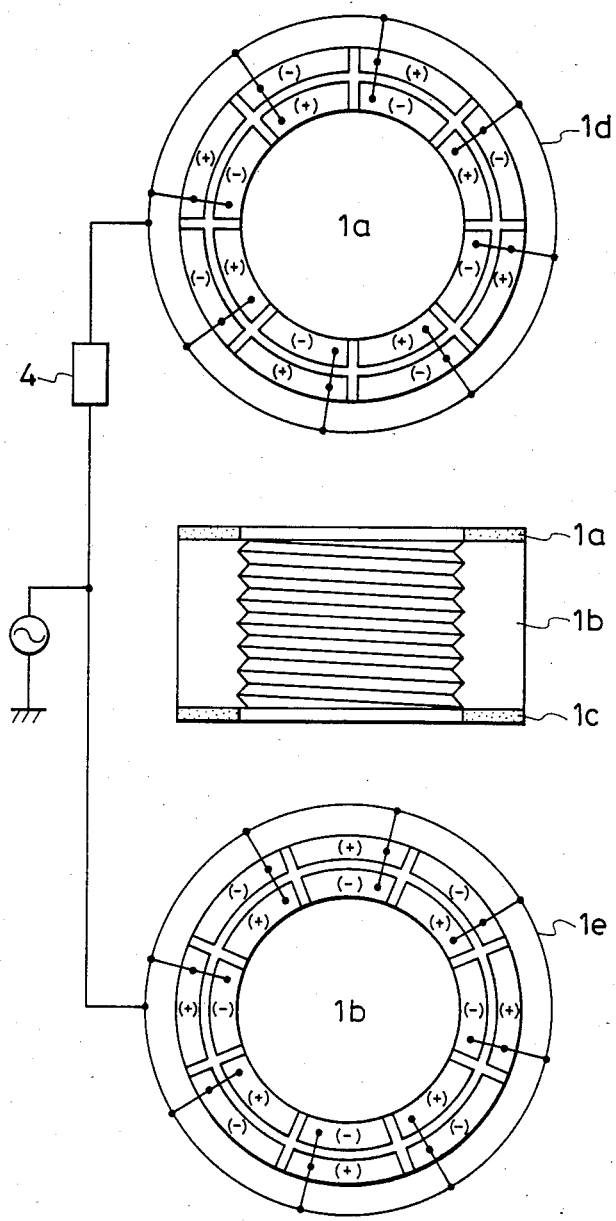

FIG. 5 shows an arrangement for setting a quaternary mode for flexural vibration in the plane of the ring in the same manner as in FIG. 3. A higher output can be generated as compared with the arrangement of FIG. 3.

In the above arrangement, the female threaded portion is formed on the vibration member. However, as shown in FIG. 6, a male threaded portion may be formed on the vibration member, and the vibration member serves as a movable member. A fixed member 20 causes to generate a travelling vibration wave in the female threaded portion and the movable member, thereby moving the movable member 1 in its axial direction by the friction with the fixed member 20.

Figure 7:
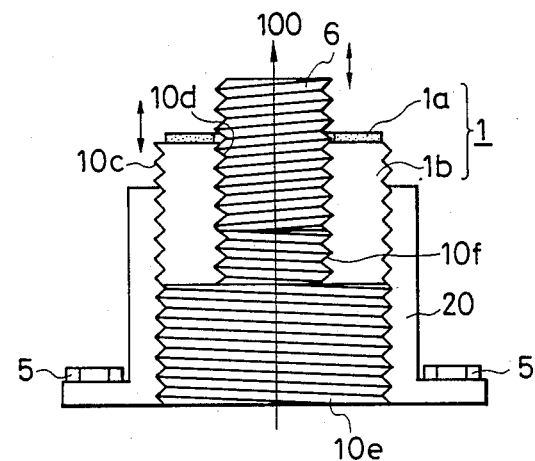
FIG. 7 is a sectional view showing a vibration member with threaded portions respectively formed on the inner and outer surfaces.

FIG. 7 is a sectional view showing an arrangement wherein threaded portions are respectively formed on the inner and outer surfaces of a circular shape vibration member. This arrangement includes a fixed member 20 fixed by bolts 5. A threaded portion 10c is formed on the outer surface of the vibration member 1. The threaded portion 10c is threadably engaged with the fixed member 20. A threaded portion 10d is formed on the inner surface of the vibration member 1 and is threadably engaged with a movable member 6. The movable member 6 has a threaded portion 10f on the outer surface thereof. Voltage signals having a 90° phase difference are applied to the piezoelectric ceramic member 1a according to the method described above to generate a travelling vibration wave in the circular shape vibration member 1. The vibration member 1 is moved along a rotational axis 100 with respect to the fixed member 20. The movable member 6 arranged inside the vibration member 1 is moved in the same moving direction of the vibration member 1 upon operation of the vibration member 1. If the pitch of the threads of the threaded portions 10c on the outer surface of the vibration member 1 is equal to that on the inner surface of the vibration member 1, the movable member 6 is moved upward along the rotational axis 100 at a speed twice the speed of the vibration member 1.

When the vibration member is subjected to extensional vibration, the direction of threads on the inner surface is the same as that on the outer surface. However, if the vibration member is subjected to flexural vibration in the plane of a ring, the direction of threads on the inner surface is opposite to that on the outer surface.

Figure 8:
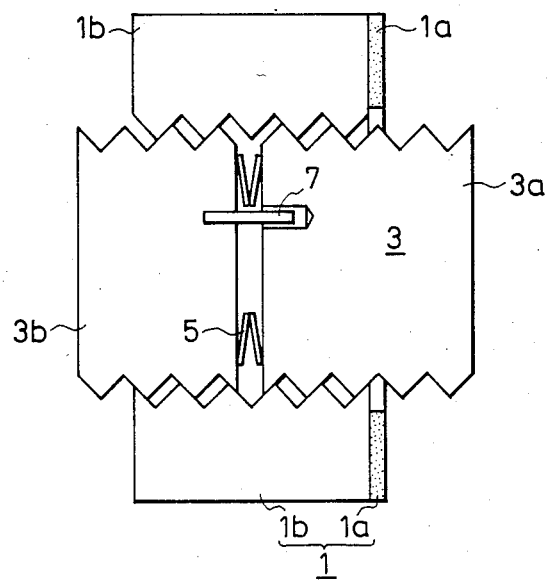
FIG. 8 is a sectional view showing a structure for stabilizing a contact pressure.

FIG. 8 is a sectional view for stabilizing a contact pressure acting on the movable member 3 contacting the vibration member 1. The arrangement includes a belleville spring 5. If the pitches of the threads of the threaded portion are not uniform, the contact pressure between the movable member 3 and the vibration member 1 is not uniform, and a stable drive force cannot be obtained. A uniform contact pressure is obtained by the belleville spring 5. The arrangement in FIG. 8 also includes a pin 7 for aligning the right and left movable members. The pin 7 is fixed on the side of a movable member 3b and is loosely fitted in a movable member 3a.

In this embodiment, the sectional shape of the threaded portion is substantially triangular. However, it is essential to provide movable and vibration members respectively having recesses and projections and to allow threadable engagement between the movable and vibration members.

Figure 9:
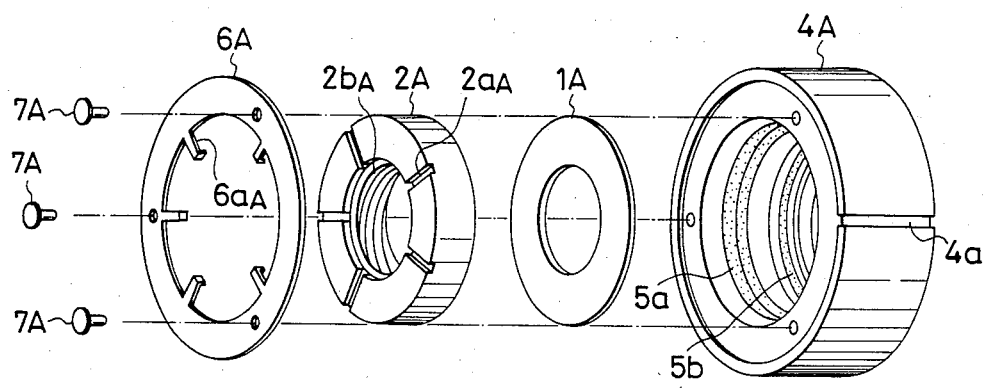
FIG. 9 is a perspective view showing a vibration member and components associated therewith according to another embodiment of the present invention.
Figure 10:
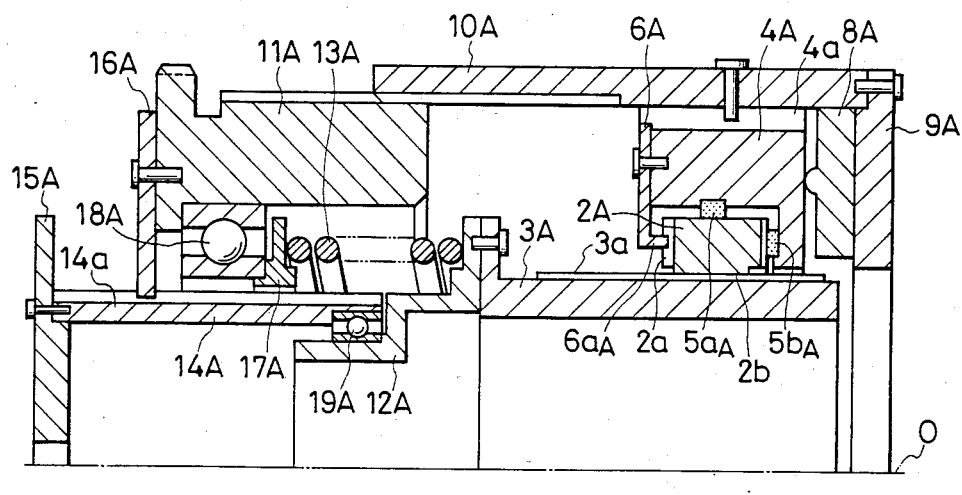
FIG. 10 is a sectional view showing a structure of a motor unit of the embodiment shown in FIG. 10.

FIG. 10 is a sectional view showing the upper half of a motor unit according to another embodiment of the present invention, and FIG. 9 is a perspective view of a vibration member and components associated therewith. The motor unit includes a ring-like piezoelectric element 1A, a metal elastic member 2A, a movable member 3A, a fixed member 4A, shock absorbing members 5aA and 5bA made of a felt or the like, a rotation stopper 6A, fastening screws 7A, a load sensor 8A, a bottom plate 9A, an outer cylinder 10A, a holding pipe 11A, a connecting member 12A, a compression spring 13A, a straight movable pipe 14a, an output plate 15A, a rotation stopper 16A, a presure member 17A, and bearings 18A and 19A. These members are of ring-like or cylindrical shape with respect to an axis O shown in FIG. 10.

The piezoelectric element 1A is adhered to the end face of the elastic member 2A made of Bs to constitute a vibration member. The vibration member is held by the shock absorbing members 5aA and 5bA such as felt at the equal angular positions of the annular cross section and is housed in a fixed member 4A. Five radial grooves 2aA are formed in the end face of the elastic member 2A at equal angular intervals. L-shaped distal ends 6aA of the rotation stoppers 6A are respectively engaged with the grooves 2aA at the central positions of the annular cross-sectional area of the elastic member 2A. The rotation stopper 6A is fixed to the fixed member 4A by the fastening screws 7A. A trapezoidal screw threaded portion 2bA (a pitch of 1.0 mm) is formed in the inner surface of the elastic member 2A. The surface of the threaded portion is Ni-plated and hardened. A trapezoidal screw threaded portion 3aA is formed on the outer surface of the movable member 3A and is threadably engaged with the trapezoidal screw threaded portion 2bA. The movable member 3A is made of aluminum. The surface of the threaded portion 3aA is hard-alumetized. The movable member 3A is connecting member 12A by screws. The connecting member 12A is compressed by the compression spring 13A in a direction indicated by the axis O through the holding pipe 11A, the bearing 18A, and the pressure member 17A. The fixed member 4A is housed in the bottom plate 9A and the outer cylinder 10A through three load sensors 8A. The fixed member 4A is positioned by the grooves 4aA and the pin from the outer cylinder 10A such that the fixed member 4A can be axially moved but cannot be rotated. The outer cylinder 10A is connected to the holding pipe 11A by screws such that the biasing force of the spring 13A can be adjusted by the position of the holding pipe 11A with respect to the outer cylinder 10A. A pressure can be monitored by each load sensor 8A. The straight movable pipe 14A is connected to the connecting member 12A through the bearing 19A. The distal end of the rotation stopper 16A mounted on the holding pipe 11A is engaged with an axial groove 14aA of the straight movable pipe 14A. The straight movable pipe 14A cannot be rotated but can be linearly moved in the direction of axis O. Linear movement can be extracted from the output plate 15A. In a manner to be described later, when the movable member 3A is rotated about the axis O by the travelling vibration wave generated by the elastic member 2a, the movable member 3A is moved in the direction of the axis O upon threadable engagement of the threaded portions 2bA and 3aA. Subsequently, the straight movable pipe 14A is linearly moved in only the direction of the axis O through the connecting member 12A. This linear movement is extracted as a motor output from the output plate 15A.

FIGS. 11A and 11B are plan views showing the outer surface (upper surface) of the piezoelectric element 1A and the surface (lower surface) contacting the elastic member 2A. Electrodes indicated by hatched regions are formed by Ni-sputtering on the upper and lower surfaces of the piezoelectric element 1A. The electrodes constitute a sector-shaped pattern. Symbols (+) and (−) on the lower surface shown in FIG. 11B represent polarities polarized upon application of positive and negative DC voltages to the upper surface shown in FIG. 11A. The extension (compression) along the circumferential direction in the negatively polarized region is opposite to that in the positively polarized region. Electrodes 1aA are drive electrodes for generating one standing wave as a so-called A phase and comprises two $\lambda/2$ sector-shaped electrodes with respect to a wavelength $\lambda$. The peripheral length of the circular shape elastic member 2A is determined to be an integer (K) multiple of the wavelength of the standing wavelength $\lambda$. If the number of waves (the number of standing waves extending on the entire edge of the elastic member 2A) is defined as K, the A-phase drive electrodes 1a comprises $(k-1)\lambda/2$ sector-shaped electrodes. Since the number of waves is three in FIGS. 11A and 11B, the A-phase drive electrodes 1aA comprise $\lambda$ sector-shaped electrodes. Similarly, electrodes 1b A are drive electrodes for generating another standing wave as a so-called B phase. The B-phase drive electrodes 1bA comprise $(k-1)\lambda/2$ sector-shaped electrodes in the same manner as in the A-phase drive electrodes 1aA. The A- and B-phase drive electrodes 1aA and 1bB are shifted by a spatial phase of 90°, i.e., $\lambda/4$. An electrode 1eA is present between the A- and B-phase drive electrodes 1aA- and 1b A. Although the electrode 1eA is not directly associated with motor driving, the electrode 1eA reduces the distortion influence of a polarization treatment in the piezoelectric element, so that polarization treatment has been performed.

An electrode 1cA serves as a vibration detection electrode (sensor-phase electrode). The sensor phase is called an S-phase. A displacement voltage caused by a reverse voltage effect upon vibration of the apparatus is extracted to achieve feedback control for the voltage applied to the A- and B-phase electrodes and the number of drive waves. The displacement voltage is also used for vibration monitoring.

The electrode 1dA is polarized to reduce polarization distortion in the same manner as in the electrode 1eA. However, the electrode 1dA serves as a common (i.e., C-phase) electrode. The lower surface of the piezoelectric element 1A in FIG. 11B is adhered to the end face of the elastic member 2A under high pressure. The elastic member 2A is macroscopically in electrical contact with the electrodes formed on the lower surface, all of which serves as an integral electrical conductor. The elastic member 2A is electrically connected to the electrode 1dA of FIG. 11A from the side surface through a conductive paste 11A such as an Ag paste. The electrode 1dA thus serves as the C-phase or common electrode. on the upper surface in FIG. 11A, the electrodes 1aA, 1bA, 1dA, and 1cA are respectively connected to lead wires 20aA, 20bA, 20dA and 20cA by an adhesive 22A and serve as the A-, B-, C and S-phase electrodes. The lead wires 20aA to 20dA are connected to an external driver (not shown).

An alternating voltage of $V = V0 \sin \omega t$ is applied from an external power source (not shown) to the A-phase drive electrodes 1aA with respect to the C-phase electrode. An alternating voltage of $V = V0 \sin (\omega t \pm \pi/2)$ is applied to the B-phase drive electrodes 1bA. A- and B-phase standing waves shifted by a spatial phase difference of $\lambda/4$ and a temporal phase difference of $\pi/2$ are combined. A travelling vibration wave having a wavelength $\lambda$ propagating along the circumferential direction is thus generated by the elastic member 2A. The direction of propagation is changed by $\pm \pi/2$ as the temporal phase difference of the standing waves, and thus the rotational direction of the motor is changed.

The vibration mode set by the elastic member 2A will be described with reference to FIGS. 12A and 12B.

The extensional vibration mode is exemplified. In this mode, the extensional vibration is defined as a combination of longitudinal vibration wherein a displacement of a mass point occurs along the circumferential direction of the ring-like elastic member 2A and transverse vibration wherein a displacement of the mass point occurs along the radial direction. The extensional vibration mode is thus defined as a mode set as if the longitudinal vibrations generated by a rod-shaped vibration member are coupled to constitute a ring shape. In the displacement coordinate system for the ring cross section in FIG. 12A, a radial displacement u and a circumferential displacement W are represented as follows:

$$u = A\cos(k\theta + \psi 1) \cos (\omega t + \psi 2)$$

$$W = kA\cos(k\theta + \psi 1) \cos (\omega t + \psi 2)$$

where A is the amplitude, k is the number of waves, $\theta$ is the angular position in the ring cross-sectional area, $\omega$ is the frequency of the alternating voltage, and $\psi 1$ and $\psi 2$ are phase errors. FIG. 12B shows u and W displacements of the ring-like elastic member 2A. The vibration member 1 has an inner diameter 24aA (the threaded portion 2bA), a central line 24bA, and an outer diameter 24cA. The radial displacement u and the circumferential displacement W cause slight deformation of the ring cross-sectional area by the Poisson deformation. For illustrative convenience in FIG. 12B, the Poisson deformation component is extremely emphasized. The movable member 3A has a contact surface 25A (i.e., the threaded portion 3aA). If the number of waves is K, the movable member 3A has K contact portions. These contact portions are shifted upon propagation of the travelling vibration wave in the circumferential direction. Therefore, the movable member 3A performs only rotation without being through the threaded portions 2bA and 3aA. When the threaded portions are formed, the movable member 3A is moved with screw motion along the screw feed direction.

Figure 14:
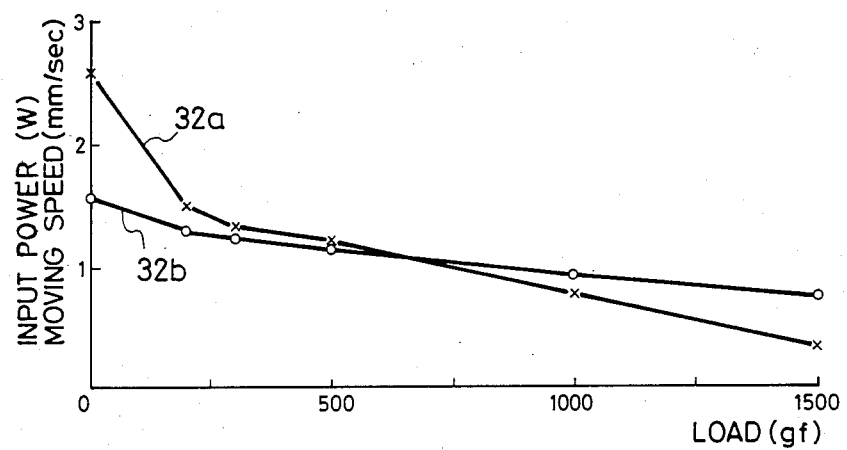
FIGS. 14 and 15 are graphs showing the input and output characteristics of the embodiment shown in FIG. 9.

FIG. 14 shows actually measured data of the input and output characteristics in a trial machine when the extensional vibration mode is set in the embodiment of FIGS. 9 to 13 (in this case, K=3). The axial load is plotted along the abscissa, and the moving speed (represented by a curve 32a) of the movable member 3A and an input power (i.e., consumed power) represented by a curve 32b are plotted along the ordinate. It should be noted that a motor drive frequency fr was about 93.4 kHz.

When the piezoelectric element pattern shown in FIG. 11 is used, only four lead wires are used (if the S-phase electrode is not used, only three lead wires are used). The leads wires need not be led from the A- and B-phase $\lambda/2$ sector-shaped electrodes. In addition, a stable output can be obtained from the S-phase electrode upon vibration of the extensional vibration mode of the vibration member 2. Polarization distortion of the piezoelectric elememt is small.

The above description has been made for the extensional vibration mode. However, flexural vibration in the plane of a ring will be described below. The flexural vibration is a bending vibration wherein a displacement of a mass point occurs in the u direction, i.e., the radial direction of the ring. FIGS. 13A and 13B are plan views of a piezoelectric element 31A used in place of the piezoelectric element 1A so as to generate flexural vibration. FIG. 13A shows the outer surface (upper surface) of the piezoelectric element 31A and FIG. 13B shows the surface (lower surface) contacting the elastic member. The Ni-sputtered electrodes are represented by hatched regions, and signs + and − represent the directions of polarization, A-, B-, C-, and D-phase electrodes respectively correspond to electrodes 31aA, 31bA, 31dA, 31cA in the same manner as in FIGS. 11A and 11B. In addition, the lengths and positional relationship thereof are the same as those of the arrangements in FIGS. 11A and 11B. A detailed description of the identical points will be omitted. A great difference between the arrangements in FIGS. 11A and 11B and FIGS. 13A and 13B is that each sector-shaped electrode comprises a pair of electrodes having different directions of polarization in FIGS. 13A and 13B. When an identical voltage is applied to each pair, the inner electrode is extended and the outer electrode contracts, thus easily bending the piezoelectric element in the u direction.

In the same manner as described above, A- and B-phase voltages are applied to the C-phase electrode 31dA, and voltages of $V0 \sin \omega t$ and $V0 \sin (\omega t \pm \pi/2)$ are respectively applied to the electrodes 31aA and 31bA. A- and B-phase standing waves are then combined to generate a vibration wave (a wave generated by bending vibration in this mode) which has a wavelength $\lambda$ and which propagates along the circumferential direction of the ring-like elastic member. The direction of wave propagation, and hence the rotational direction of motor can be changed on the basis of $\pm \pi/2$.

Figure 15:
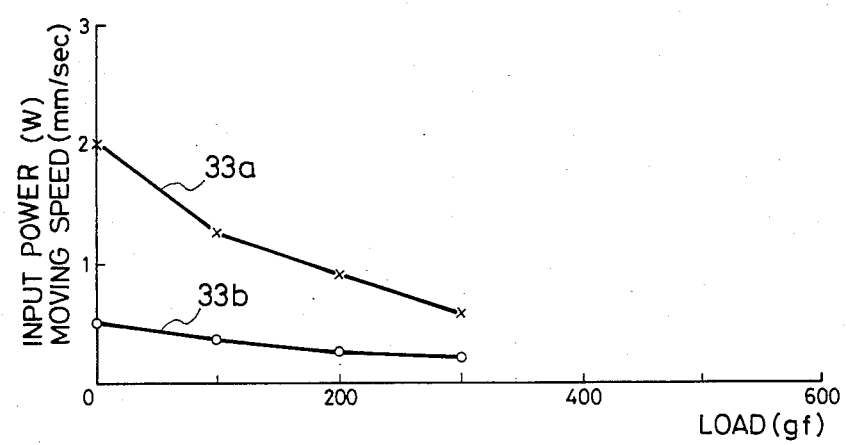

FIG. 15 shows actually measured data of the input and output characteristics in a trail machine when the flexural vibration mode is set in the embodiment of FIGS. 9 to 13 (in this case, K=4). The axial load is plotted along the abscissa, and the moving speed (represented by a curve 33a) of the movable member 3A and an input power (i.e., consumed power) represented by a curve 33b are plotted along the ordinate. it should be noted that a motor drive frequency fr is was about 28.7 kHz.

When the piezoelectric element pattern shown in FIGS. 13A and 13B is used, only four lead wires are used. The lead wires need not be led from the A- and B-phase λ/2 sector-shaped electrodes. In addition, a stable output can be obtained from the pairs each consisting of inner and outer λ/4 sector-shaped electrodes having opposite polarization directions upon vibration of the extensional vibration mode of the vibration member 2. Polarization distortion of the piezoelectric element is small.

In the above description, the threaded portion is formed on the inner surface of the circular shape vibration member. However, a threaded portion may be formed on the outer surface of the vibration member, a threaded portion may be formed on the inner surface of the movable member, and the vibration and movable members may be engaged with each other. Alternatively, trapezoidal screw threaded portions are formed on the outer and inner surfaces of the vibration member, and the vibration member may be threadably engaged with the movable member located inside the vibration member and with the movable member located outside the vibration member. The thread is not limited to the trapezoidal screw thread but may be a triangular screw thread or a screw thread of any shape. The number and pitch of threads and the thread length may be arbitrarily determined according to a given design concept.

As described above, according to the embodiment of the present invention, the movable member of the circular shape in the travelling vibration wave motor is threadably engaged with the movable member therein. The pressure acting on the vibration member contacting the movable member can be stabilized. Simple flat piezoelectric elements are bonded to the end faces of a vibration member in a direction perpendicular to the axis O, thus providing a low-cost, compact vibration wave motor. In addition, the lead wires can be easily led, polarization distortion of the piezoelectric element is small, and a stable sensor output with high sensitivity can be produced.

Still other embodiments of the present invention will be described with reference to FIGS. 16 and 17. The same reference numerals as in FIGS. 9 to 13B denote the same parts in FIGS. 16 and 17.

Figure 16:
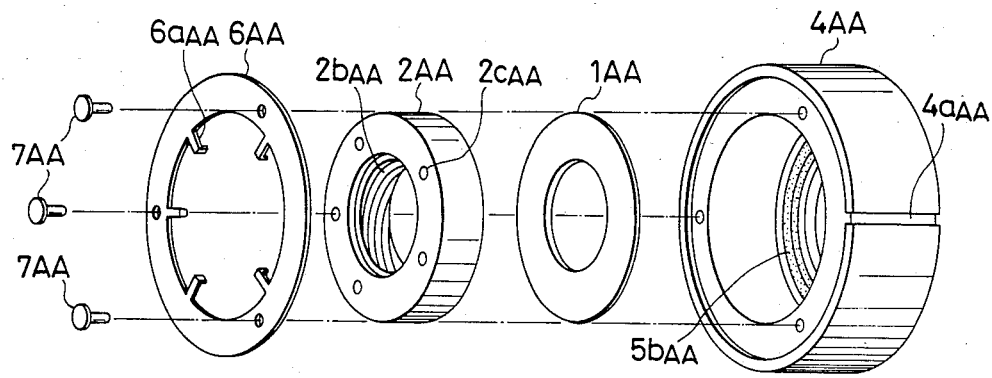
FIGS. 16 and 17 are respectively perspective views showing vibration members and components associated therewith according to still other embodiments of the present invention.

In the embodiment of FIG. 16, a threaded portion 2bAA is formed on the inner surface of an elastic member 2AA. Five shallow blind holes 2cAA for a rotation stopper are formed at central positions of the annular cross-sectional area at equal angular intervals. L-shaped distal end portions 6aAA of a rotation stopper 6AA are respectively inserted in the shallow blind holes 2cAA. In this embodiment, the vibration member can be positioned with respect to the rotational direction and the radial direction. The radial shock absorbing members 5aA (FIG. 10) can be omitted.

Figure 17:
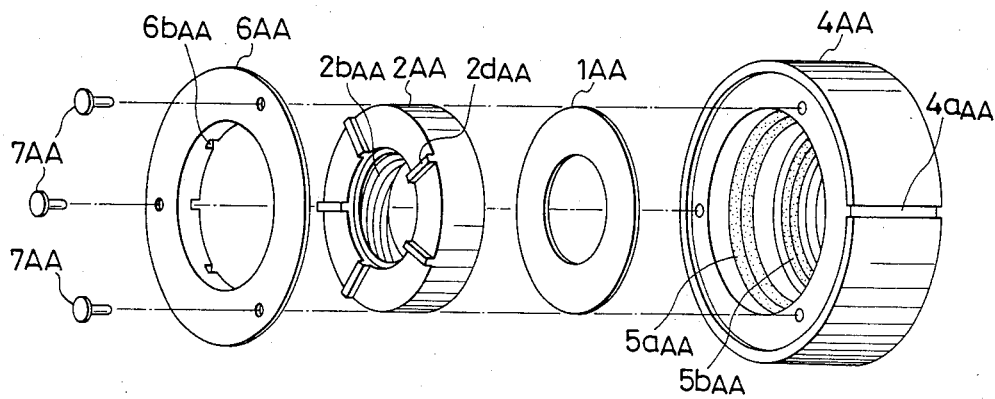

In the embodiment of FIG. 17, a threaded portion 2bAA is formed on the inner surface of an elastic member 2AA. Five radially extended narrow projections 2dAA for the rotation stopper 6AA are formed on the surface of the elastic member 2AA at equal angular intervals. The projections 2dAA are respectively engaged with grooves 6bAA formed on the rotation stopper 6AA.

Referring to FIGS. 16 and 17, the pitch $\rho$ of the holes 2aAA and the projections 2dAA, and λ/2 must be defined in such a manner that they are not integral-number-multiples of each other.

Figure 18A:
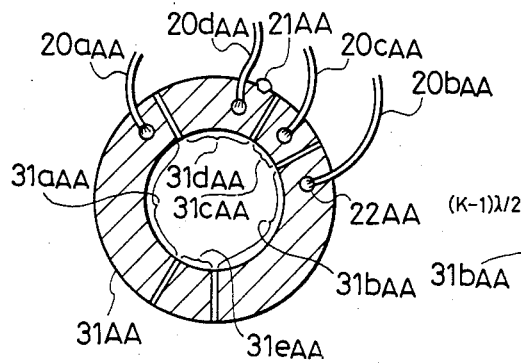
FIGS. 18A and 18B are plan views of a piezoelectric element for flexural vibration in the plane of a ring in the embodiments of FIGS. 16 and 17.
Figure 18B:
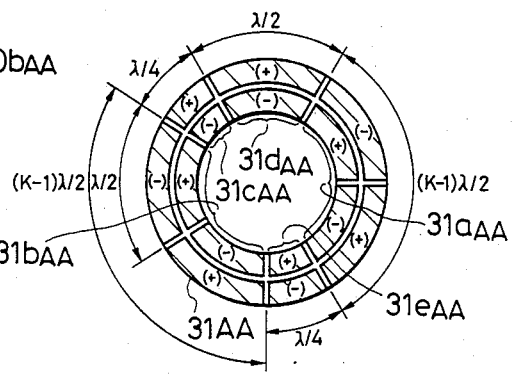

The above embodiment employs extensional vibration. However, flexural vibration may be employed in the following manner. The flexural vibration is a bending vibration wherein a displacement of a mass point occurs in the u direction in FIG. 12A, i.e., the radial direction of the ring. FIGS. 18A and 18B are plan views of a piezoelectric element 31AA used in place of the piezoelectric element 1AA so as to cause flexural vibration. FIG. 18A shows the outer surface (upper surface) of the piezoelectric element 31AA and FIG. 18B shows the surface (lower surface) contacting the elastic member. The Ni-sputtered electrodes are represented by hatched regions, and signs (+) and (−) represent the directions of polarization, A-, B-, C-, and D-phase electrodes respectively correspond to electrodes 31aAA, 31bAA, 31dAA, and 31cAA in the same manner as in FIGS. 11A and 11B. In addition, the lengths and positional relationship thereof are the same as those of the arrangements in FIGS. 11A and 11B. A detailed description of the identical points will be omitted. A great difference between the arrangements in FIGS. 11A and 11B and FIGS. 18A and 18B is that each sector-shaped electrode comprises a pair of electrodes having different directions of polarization in FIGS. 18A and 18B. When an identical voltage is applied to each pair, the inner electrode is extended and the outer electrode contracts, thus easily bending the piezoelectric element in the u direction. In the same manner as described above, A- and B-phase voltages are applied to the c-phase electrode 31dAA, and voltages of V0 sin ωt and V0 sin (ωt±π/2) are respectively applied to the electrodes 31aAA and 31bAA. A- and B-phase standing waves are then combined to generate a vibration wave (a wave generated by bending vibration in this mode) which has a wavelength λ and which propagates along the circumferential direction of the ring-like elastic member. The direction of wave propagation, and hence the rotational direction of the motor can be changed on the basis of ±π/2.

In the embodiment utilizing the flexural vibration in the plane of a ring, the same vibration member positioning structure shown in FIGS. 16 or 17 can be employed.

The thread meshing with the vibration and movable members is not limited to a triangular screw thread but can be replaced with a triangular screw thread or a screw thread of any shape. The number and pitch of threads and the thread length may be arbitrarily designed.

As is apparent from the above description according to this embodiment, the vibration member and the movable member in the travelling vibration wave motor are threadably engaged to stabilize the pressure acting between the movable and vibration members. In addition, positioning of the vibration member and rotation prevention at the time of high-load operation can be achieved by a simple means without adversely affecting the vibration of the vibration member.

Figure 19A:
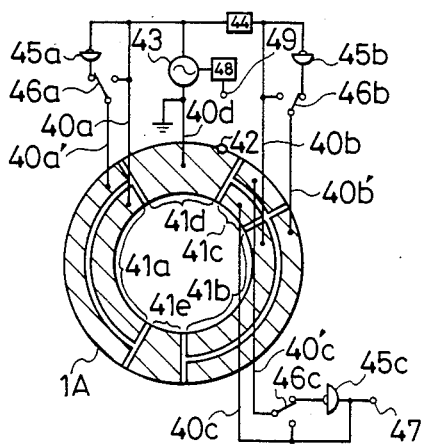
FIGS. 19A and 19B are plan views of a piezoelectric element using the motor unit, showing electrical connections thereof, according to the embodiments of FIGS. 16 and 17.
Figure 19B:
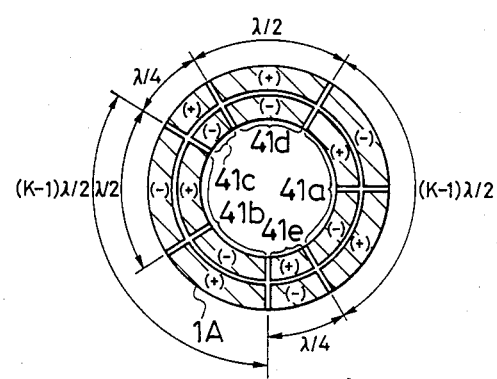

FIGS. 19A and 19B are plan views of a piezoelectric element 1A used in the embodiment of FIGS. 9 and 10. FIG. 19A shows the outer surface (upper surface) of a piezoelectric element 1A, and FIG. 19B shows the surface (lower surface) contacting an elastic member 2A (FIG. 10). Electrodes are Ni-sputtered on the upper and lower surfaces of the piezoelectric element 1A, as indicated by hatched regions. The electrode pattern comprises a plurality of sector-shaped electrodes. Symbols (+) and (−) on the lower surface in FIG. 19B represent polarities obtained by applying positive and negative voltages to the upper surface in FIG. 19A. When a voltage having a given polarity is applied to a positively polarized region and a negatively polarized region, the direction of extension of the positively polarized region along the circumferential direction is opposite to that of the negatively polarized region. All sector-shaped electrodes shown in FIG. 19B comprise pairs each consisting of positively and negatively polarized electrodes. The positions of the electrode pairs on the upper surface respectively correspond to those on the lower surface. On either surface, electrodes constitute regions 41a, 41b, 41c and 41d along the circumferential direction. The electrodes 41a serve as drive electrodes for generating one standing wave called an A-phase wave. The positively and negatively polarized sector-shape electrodes each having a length of λ/2 with respect to the wavelength λ are alternatively arranged. The edge length of the circular shape elastic member 2A is determined to be an integer (K) multiple of the wavelength λ of the standing wave. If the number of waves (i.e., the number of standing waves extending on the entire edge of the elastic member 2) is given as K, the A-phase drive electrodes 41a comprises (K-1)λ/2 sector-shaped electrodes. Since the number of waves is 3 in the case of FIGS. 19A and 19B, the A-phase drive electrodes 41a are λ sector-shaped electrodes. Similarly, electrodes 41b serve as drive electrodes for generating another standing wave called a B phase wave. The B-phase drive electrodes 41a comprise (K−1)λ/2 sector-shaped electrodes in the same manner as in the A-phase drive electrodes 41a. The A- and B-phase drive electrodes 41a and 41b are phase-shifted by a spatial phase difference of 90°, i.e., λ/4, and interpose an electrode 41e therebetween. The electrode 41e is not directly associated with motor driving, but serves to reduce polarization distortion in the entire piezoelectric element and is thus subjected to a polarization treatment.

Electrodes 41c serve as vibration sensing or S-phase electrodes and extract a displacement voltage caused by a reverse voltage effect upon vibration of the vibration member. The S-phase electrodes 41c serve to apply voltages of the A- and B-phase electrodes and to provide feedback control to the drive frequency. In this manner, the S-phase electrodes 41c are used to monitor vibration.

The electrodes 41d are polarized to reduce polarization distortion in the same manner as in the electrodes 41e and serve as common or C-phase electrodes. The lower surface (FIG. 19B) of the piezoelectric element 1A (see FIGS. 9 and 10) are adhered to the end face of the elastic member 2A under high pressure. All electrodes on the lower surface of the piezoelectric element 1A are macroscopically electrically brought into contact with the elastic member 2A and serve as an integral electrode. The elastic member 2A is electrically coupled to the electrode 41d on the upper surface shown in FIG. 19A through a conductive paste 42 such as an Ag paste to constitute an integral C-phase common electrode.

The above embodiment can be applied to either extensional vibration or flexural vibration in the plane of a ring. Extensional vibration is a combination of longitudinal vibration generated along the circumferential direction of the circular shape elastic member 2A and transverse vibration generated along the radial direction. The extensional vibration occurs as if longitudinal vibrations of the rod-shaped vibration member are coupled to constitute ring-like vibrations. Flexural vibration in the plane of a ring is a vibration generated such that a displacement of a mass point occurs along the radial direction of the ring.

Electrical connections for selecting one of the above-mentioned vibration modes will be described below.

The common electrodes 41a are electrically connected to the vibration member through the conductive paste 42 and are grounded through a lead wire 40d. The drive frequency of an AC power source 43 is controlled by an oscillator 48. The inner A-phase sector-shaped electrodes 41a are connected to a lead wire 40a and are applied with an AC voltage. The inner B-phase sector-shaped electrode 41b is connected to a lead wire 40b and is applied with an AC voltage through a ±90° phase shifter 44. The inner S-phase λ/4 sector-shaped electrode 41c is connected to a lead wire 40c, and a sensor terminal 47 thereof is used for monitoring vibration and is fed to a frequency control terminal 49 of the oscillator 48 to constitute a feedback loop.

In the extensional vibration mode, switches 46a, 46b, and 46c are switched to the sides of inverters 45a, 45b and 45c, respectively. The inner and outer sector-shaped electrodes 41a, 41b, and 41c serve as an integral electrode. The direction of extension of the inner side of the vibration member is the same as that of the outer side thereof. Therefore, extensional vibration causes to generate a travelling vibration wave propagating along the circumferential direction of the vibration member 2A.

In order to set the flexural vibration mode, the switches 46a, 46b, and 46c are switched (direction opposite to the illustrated direction) and disconnected from the inverters 45a, 45b, and 45c, respectively, and the direction of extension of the inner side of the vibration member 2A is opposite to that of the outer side thereof. The vibration wave by flexural vibration propagates along the circumferential direction of the vibration member 2A. The direction of travelling vibration wave, and hence the drive direction of the motor are determined by a sign (i.e., positive or negative) of the phase difference given by the phase shifter 44.

In this case, the extensional vibration mode and the flexural vibration mode have different resonant frequencies of the vibration member 2A. The drive frequencies of the oscillator 48 must be changed accordingly. For example, the resonant frequencies in the extensional and flexural vibration modes are defined as fr1 and fr2:

$$fr1 = (1/2\pi)\sqrt{E/\rho R^2}$$

$$fr2 = (1/2\pi)\sqrt{(EIK^2(1-K^2)^2)/(\rho AR^4(1+K^2))}$$

where E is the Young's modulus, $\rho$ is the density, R is the radius, A is the cross-sectional area of the vibration member, I is the cross-sectional secondary movement, and K is the number of vibration waves.

Figure 20:
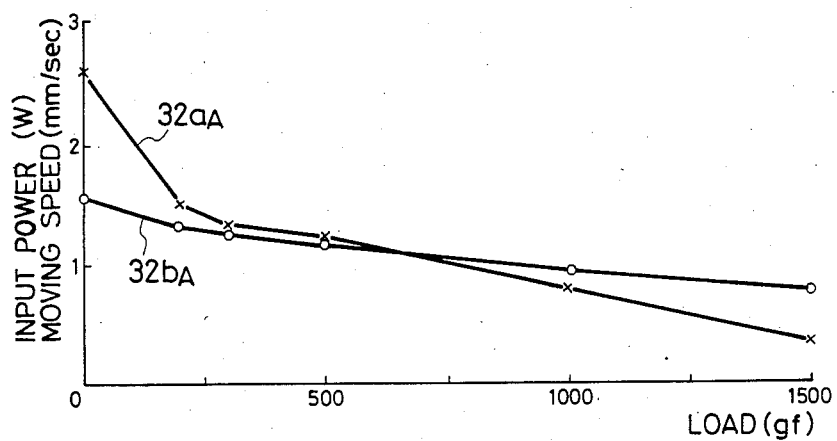
FIGS. 20 and 21 are graphs showing the input and output characteristics in the embodiments of FIGS. 16 and 17.

FIG. 20 shows measured data of the input/output characteristics of the trail apparatus utilizing the extensional vibration mode shown in FIG. 19A (in this case, K=3). The axial load is plotted along the abscissa. The moving speed (represented by a curve 32aA) of the movable member (see FIG. 10) is plotted along the ordinate. The input power (consumed power) (represented by curve 32bA) corresponding to the moving speed is also plotted along the ordinate. In this case, the motor drive frequency fr was about 93.4 kHz.

Figure 21:
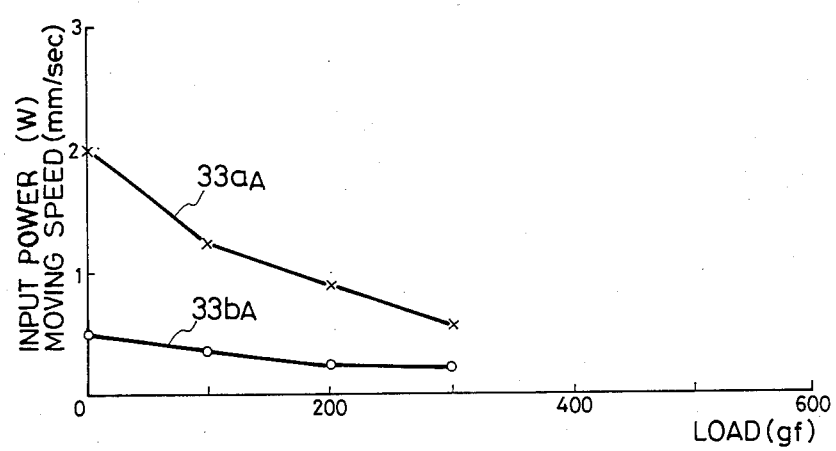

FIG. 21 shows measured data of the input-output characteristics of the trail apparatus utilizing the flexural vibration mode (in this case, K=4). The axial load is plotted along the abscissa. The moving speed (represented by a curve 33aA) of the movable member is plotted along the ordinate. The input power (i.e. consumed power, represented by curve 33bA) corresponding to the moving speed is also plotted along the ordinate. In this case, the motor drive frequency fr was about 28.7 kHz.

According to the above embodiments, the extensional or flexural vibration mode can be selectively set to allow changes in motor characteristics. Therefore, versatility of motor design can be improved.

The piezoelectric element for extensional vibration mode can be operated to generate flexural, torsional vibration at right angles to the plane of ring. Therefore, the piezoelectric element 1A can be applied to a vibration wave motor utilizing flexural, torsional vibration at right angles to the plane of ring, as described in Japanese Patent Unexamined No. 210173/1985, instead of flexural vibration on the plane of a ring. Therefore, these three vibration modes can be achieved by changing the motor drive frequency. Three motor characteristic curves can be obtained. Therefore, the three characteristics may be selectively utilized, as descred, in effecting motor design.

In the above embodiment, the threaded portion is formed on the inner surface of the vibration member. However, a threaded portion may be formed on the outer surface of the circular shape vibration member, and a threaded portion is formed on the inner surface of the movable member. Alternatively, the trapezoidal screw threads may be formed on both the inner and outer surfaces of the vibration member. This vibration member may be threadably engaged with the movable member located therein and the circular shape movable member located thereoutside. The thread is not limited to the triangular screw thread, but can be replaced with a triangular screw thread or a screw thread of any shape. The number and pitch of threads and the thread length may be arbitrarily determined. In a motor having no threaded portions, three vibration modes can be obtained. Motor design versatility can be improved regardless of the presence/absence of the threaded portions.

According to the embodiment shown in FIGS. 19A and 19B, three vibration modes can be set by a single piezoelectric element in the vibration wave motor. Three motor characteristic curves can be selected accordingly, and versatility of motor design can be improved. In addition, a low-cost vibration wave motor can be provided by using a piezoelectric element of a flat plate.

According to the present invention as described above, threaded portions are formed at contact portions between the vibration member and the movable or fixed member in the circular ring shape travelling vibration wave motor to provide the following advantages:

(1) A conversion mechanism for converting rotational movement into linear movement can be omitted; and (2) No energy loss occur since the energy conversion mechanism is omitted, and thus a highly efficient linear actuator can be provided.

What is claimed is:

1. A vibration wave motor comprising:
   (a) circular shape vibration means having a helical stepped portion inside or outside thereof;
   (b) means, coupled to said vibration means, for causing said vibration means to generate a travelling vibration wave propagating along a circumferential direction of said vibration means; and
   (c) movable means having a stepped portion, threadably engaged with said helical stepped portion said movable means being frictionally driven by the travelling vibration wave generated by said vibration means.

2. A motor according to claim 1, wherein said vibration means comprises a female threaded portion engaged with said stepped portion of said movable means.

3. A motor according to claim 2, wherein said movable means comprises a male threaded portion engaged with said stepped portion of said vibration means.

4. A motor according to claim 1, wherein said generating means has electro-mechanical conversion elements connected to said vibration means in such a manner that said vibration means generates the travelling vibration wave when electrical signals having a phase difference therebetween are applied to said elements.

5. A motor according to claim 1, wherein said vibration means comprises a male threaded portion engaged with said stepped portion of said movable means.

6. A motor according to claim 1, wherein said movable means comprises a female threaded portion engaged with said stepped portion of said vibration means.

7. A motor according to claim 1, wherein said generating means has electro-mechanical conversion elements connected to said vibration means in such a manner that said vibration means generates the travelling vibration wave when electrical signals having a phase difference therebetween are applied to said elements.

8. A vibration wave motor comprising:
   (a) cylindrical vibration means having a helical stepped portion inside or outside thereof;
   (b) a pair of electro-mechanical conversion means, respectively connected to end faces of said vibration means, for causing said vibration means to generate a travelling vibration wave propagating along a circumferential direction of said vibration means; and
   (c) movable means having a stepped portion threadably engaged with said helical stepped portion, said movable means being frictionally driven by the travelling vibration wave generated by said vibration means.

9. A motor according to claim 8, wherein said vibration means generates the travelling vibration wave when electrical signals having a phase difference therebetween are applied to said pair of electro-mechanical conversion means.

10. A vibration wave motor comprising:
    (a) circular shape vibration means having a helical stepped portion inside or outside thereof, said vibration means being provided with an engaging portion in part thereof;
    (b) means, coupled to said vibration means, for causing said vibration means to generate a travelling vibration wave propagating along a circumferential direction of said vibration means;

(c) movable means having a stepped portion threadably engaged with said helical stepped portion, said movable means being frictionally driven by the travelling vibration wave generated by said vibration means; and (d) fixing means having an engaging portion engaged with said engaging portion of said vibration means, for fixing said vibration means at a predetermined position.

11. A motor according to claim 10, wherein said engaging portion of said fixing means includes an L-shaped distal end portion engaged with said engaging portion of said vibration means.

12. A motor according to claim 11, wherein said engaging portion of said vibration means includes a plurality of recesses.

13. A motor according to claim 10, wherein said engaging portion of said vibration means includes a plurality of projections.

* * * * *

UNITED STATES PATENT AND TRADEMARK OFFICE
CERTIFICATE OF CORRECTION

PATENT NO. : 4,734,610            Page 1 of 4

DATED : March 29, 1988

INVENTOR(S) : I. Okumura, et al.

It is certified that error appears in the above-identified patent and that said Letters Patent is hereby corrected as shown below:

AT [57] IN THE ABSTRACT

Line 1, "includes" should read --includes a--.
    Line 3, "said" should read --the--.

IN THE DRAWING

Figure 10, "14a" should read --14aA--.

COLUMN 2

Line 6, "linear" should read --inner--.
    Line 13, "angluar" should read --angular--.
    Line 20, "embodimennt" should read --embodiment--.
    Line 30, "ceramic members" should read
        --ceramic elements--.
    Line 45, "of the" should read --including the--.

COLUMN 3

Line 63, "arrangment" should read --arrangement--.

UNITED STATES PATENT AND TRADEMARK OFFICE
CERTIFICATE OF CORRECTION

PATENT NO. : 4,734,610

DATED : March 29, 1988

INVENTOR(S) : I. Okumura, et al.

It is certified that error appears in the above-identified patent and that said Letters Patent is hereby corrected as shown below:

COLUMN 4

Line 10, "vibration ring" should read --vibration wave--.
Line 19, "arrangment" should read --arrangement--.

COLUMN 5

Line 31, "pipe 14a," should read --pipe 14A,--.
Line 58, "connecting" should read --connected to the connecting--.

COLUMN 6

Line 47, "1b A" should read --1bA--.
Line 52, "1bB" should read --1bA--.
Line 55, "1aA- and 1b A." should read --1aA and 1bA.--.

COLUMN 7

Line 12, "11A" should read --21A--.
Line 14, "on" should read --On--.
Line 17, "C and" should read --C- and--.

UNITED STATES PATENT AND TRADEMARK OFFICE
CERTIFICATE OF CORRECTION

PATENT NO. : 4,734,610

DATED : March 29, 1988

INVENTOR(S) : I. Okumura, et al.

It is certified that error appears in the above-identified patent and that said Letters Patent is hereby corrected as shown below:

COLUMN 8

Line 20, "leads" should read --lead--.
    Line 25, "elememt" should read --element--.
    Line 38, "+ and -" should read --(+) and (-)--.
    Line 64, "motor" should read --the motor--.
    Line 67, "trail" should read --trial--.

COLUMN 9

Line 5, "it" should read --It--.
    Line 6, "is" should be deleted.

COLUMN 10

Line 4, "2aAA" should read --2cAA--.
    Line 35, "c-" should read --C---.

COLUMN 11

Line 28, "member 2)" should read --member 2A)--.
    Line 34, "B phase" should read --B-phase--.
    Line 35, "electrodes 41a" should read --electrodes 41b--.

UNITED STATES PATENT AND TRADEMARK OFFICE
CERTIFICATE OF CORRECTION

PATENT NO. : 4,734,610

DATED : March 29, 1988

INVENTOR(S) : I. Okumura, et al.

It is certified that error appears in the above-identified patent and that said Letters Patent is hereby corrected as shown below:

COLUMN 12

Line 66, "trail" should read --trial--.

COLUMN 13

Line 8, "trail" should read --trial--.
    Line 32, "discred," should read --desired,--.

COLUMN 14

Line 1, "occur" should read --occurs--.

Signed and Sealed this

Fourth Day of October, 1988

Attest:

DONALD J. QUIGG

*Attesting Officer*    *Commissioner of Patents and Trademarks*